(12) United States Patent
Hasegawa et al.

(10) Patent No.: US 11,018,762 B2
(45) Date of Patent: May 25, 2021

(54) TRANSMISSION DEVICE, TRANSMISSION SYSTEM, AND TRANSMISSION METHOD

(71) Applicant: FUJITSU LIMITED, Kawasaki (JP)

(72) Inventors: Makoto Hasegawa, Sapporo (JP); Norifumi Shukunami, Yokohama (JP); Jun Okabe, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/889,284

(22) Filed: Jun. 1, 2020

(65) Prior Publication Data

US 2020/0389231 A1    Dec. 10, 2020

(30) Foreign Application Priority Data

Jun. 7, 2019 (JP) .............................. JP2019-107395

(51) Int. Cl.

| | |
|---|---|
| *H04B 10/08* | (2006.01) |
| *H04B 10/077* | (2013.01) |
| *H04B 10/50* | (2013.01) |
| *H04B 10/54* | (2013.01) |

(52) U.S. Cl.
CPC ....... *H04B 10/0775* (2013.01); *H04B 10/505* (2013.01); *H04B 10/54* (2013.01); *H04B 2210/078* (2013.01)

(58) Field of Classification Search
CPC .......... H04B 10/07955; H04B 10/0795; H04B 10/07957; H04B 10/0793; H04B 10/0775; H04B 10/0797; H04B 10/40; H04J 14/02; H04J 14/0272; H04J 14/0275

USPC ........ 398/25, 26, 27, 30, 31, 32, 33, 34, 38, 398/158, 159, 177, 181, 79, 43, 16, 135, 398/136, 137, 138, 139, 162, 183

See application file for complete search history.

(56) References Cited

U.S. PATENT DOCUMENTS

| | | | |
|---|---|---|---|
| 6,765,659 B1* | 7/2004 | Bhatnagar ............ | G01M 11/338 356/73.1 |
| 2009/0169212 A1 | 7/2009 | Onaka et al. | |
| 2010/0080562 A1* | 4/2010 | Perkins ................. | H04J 14/025 398/98 |
| 2011/0176801 A1* | 7/2011 | Yano ................... | H04B 10/0775 398/30 |
| 2014/0079385 A1* | 3/2014 | Shukunami ......... | H04J 14/0275 398/16 |

FOREIGN PATENT DOCUMENTS

| | | |
|---|---|---|
| JP | 5-191359 | 7/1993 |
| JP | 2008-99178 | 4/2008 |
| JP | 2009-159290 | 7/2009 |

* cited by examiner

*Primary Examiner* — Hanh Phan
(74) *Attorney, Agent, or Firm* — Staas & Halsey LLP

(57) ABSTRACT

A transmission device that transmits main signal light to another transmission device via a transmission path, the transmission device includes a transmitter that generates monitoring signal light with intensity modulation based on a signal related to monitoring control of the transmission device and the other transmission device, a multiplexer that multiplexes the monitoring signal light into the main signal light, a receiver that acquires light receiving information from the other transmission device, the light receiving information being related to a light receiving state of the monitoring signal light, and a control circuit that controls a modulation degree of the intensity modulation in accordance with the light receiving information.

15 Claims, 11 Drawing Sheets

TRANSMISSION DEVICE, TRANSMISSION SYSTEM, AND TRANSMISSION METHOD

CROSS-REFERENCE TO RELATED APPLICATION

This application is based upon and claims the benefit of priority of the prior Japanese Patent Application No. 2019-107395, filed on Jun. 7, 2019, the entire contents of which are incorporated herein by reference.

FIELD

The embodiments discussed herein are related to a transmission device, a transmission system, and a transmission method.

BACKGROUND

For example, there is a transmission device that multiplexes monitoring signal light of a transmission system into main signal light in which more than one wavelength light is wavelength-multiplexed, and transmits the multiplexed signal light.

Related art is disclosed in, for example, Japanese Laid-open Patent Publication No. 2009-159290, or the like.

SUMMARY

According to an aspect of the embodiments, a transmission device that transmits main signal light to another transmission device via a transmission path, the transmission device includes a transmitter that generates monitoring signal light with intensity modulation based on a signal related to monitoring control of the transmission device and the other transmission device, a multiplexer that multiplexes the monitoring signal light into the main signal light, a receiver that acquires light receiving information from the other transmission device, the light receiving information being related to a light receiving state of the monitoring signal light, and a control circuit that controls a modulation degree of the intensity modulation in accordance with the light receiving information.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

When transmission power of monitoring signal light increases, a nonlinear optical effect such as cross-phase modulation occurs in main signal light and the monitoring signal light in a transmission path, which may thus lead to a degradation of transmission quality of the main signal light. In response to this, the nonlinear optical effect may be suppressed if the power of the monitoring signal light is reduced. However, there is a possibility that due to shortage of the power of the monitoring signal light, the monitoring signal light may not be received normally and a monitoring control function of a transmission device may degrade.

Therefore, it is an object of the present disclosure to provide a transmission device, a transmission system, and a transmission method capable of suppressing nonlinear optical effect without degrading a monitoring control function.

As an aspect of the present application, the nonlinear optical effect may be suppressed without degrading the monitoring control function of the transmission device.

Figure 1A:
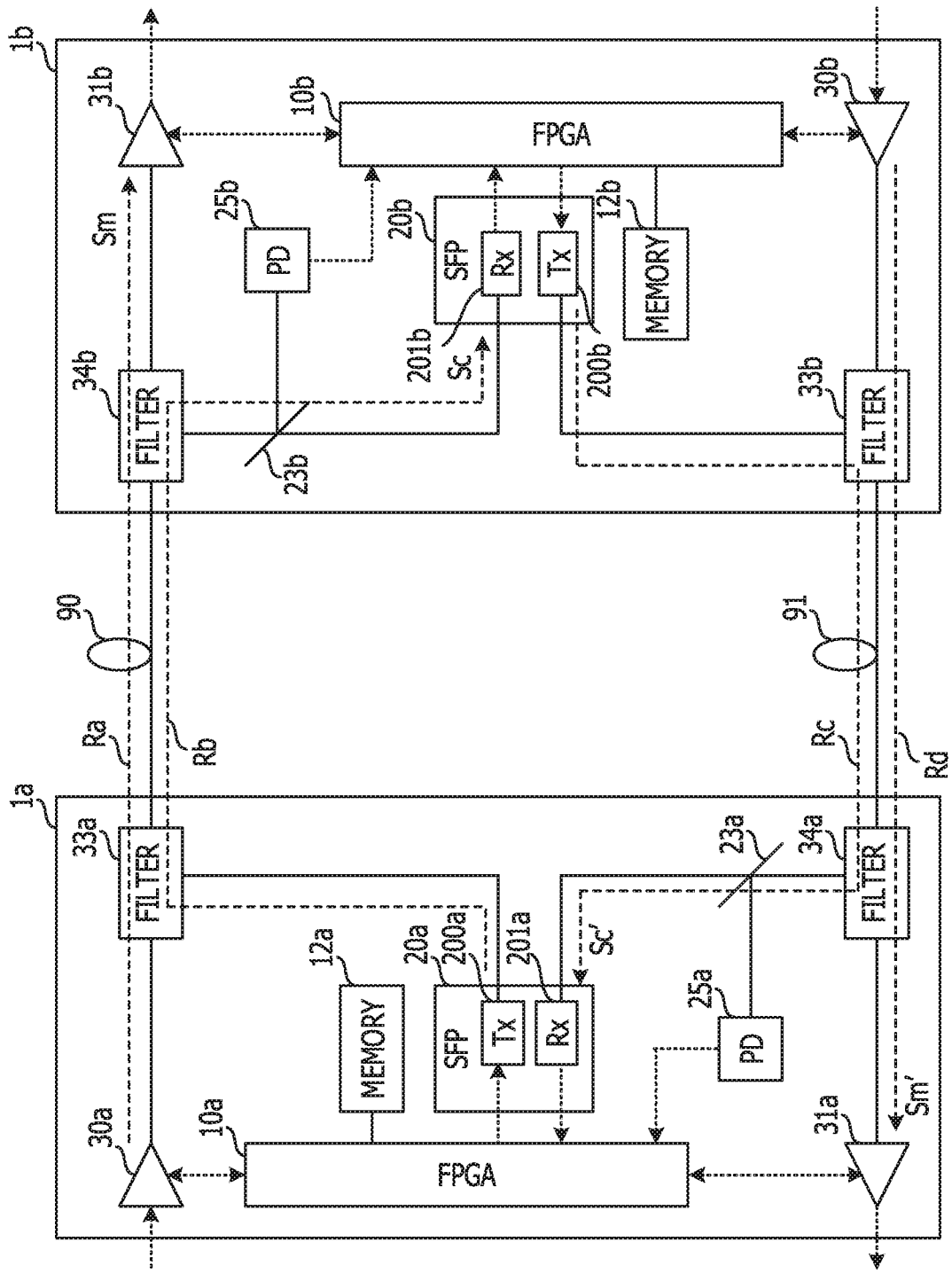
FIG. 1A is a configuration diagram illustrating an example of a transmission system.

FIG. 1A is a configuration diagram illustrating an example of the transmission system. The transmission system includes a pair of transmission devices 1a and 1b coupled to each other via transmission paths 90 and 91, such as optical fibers.

The transmission devices 1a and 1b are, for example, a wavelength multiplex transmission device such as a reconfigurable optical add-and-drop multiplexer (ROADM). The transmission devices 1a and 1b transmit to the other transmission devices 1b and 1a main signal light Sm and Sm' in which more than one wavelength light having wavelengths that differ from each other. is wavelength-multiplexed. Although a process to transmit the main signal light Sm from the transmission device 1a to the transmission device 1b via the transmission path 90 is described in an example to be described later, a process to transmit the main signal light Sm' from the transmission device 1b to the transmission device 1a via the transmission path 91 is also executed similarly.

The transmission device 1a is an example of a first transmission device, and transmits the main signal light Sm to the transmission path 90. Into the main signal light Sm is wavelength-multiplexed more than one wavelength light including user data such as an Ethernet (registered trademark, same as hereinafter) frame. The transmission device 1b is an example of a second transmission device, and receives the main signal light Sm from the transmission device 1a via the transmission path 90. A numeral Ra denotes a path through which the main signal light Sm is transmitted from the transmission device 1a to the transmission device 1b. A numeral Rd denotes a path through which the main signal light Sm' is transmitted from the transmission device 1b to the transmission device 1a.

The transmission devices 1a and 1b generate monitoring signal light Sc by the intensity modulation of the light based on a signal related to monitoring control (alarm or the like. Hereinafter denoted as a "monitoring signal") of the transmission devices 1a and 1b, multiplex the monitoring signal light Sc into the main signal light Sm and Sm', and transmit the multiplexed signals to the other transmission devices 1b and 1a. The monitoring signal light Sc is, for example, optical supervisory channel (OSC) light. The monitoring signal light Sc and Sc' has a wavelength separated from a waveband of the wavelength light included in the main signal light Sm and Sm' by a predetermined wavelength band. A numeral Rb denotes a path through which the monitoring signal light Sc is transmitted from the transmission device 1a to the transmission device 1b. A numeral Rc denotes a path through which the monitoring signal light Sc' is transmitted from the transmission device 1b to the transmission device 1a.

When the transmission power of the monitoring signal light Sc becomes too intense, the nonlinear optical effect such as the cross-phase modulation occurs in the main signal light Sm and the monitoring signal light Sc in the transmission path 90, which may thus lead to the degradation of the transmission quality of the main signal light Sm.

Then, the transmission device 1a acquires light receiving information related to a light receiving state of the monitoring signal light Sc from the other transmission device 1b, and suppresses a modulation degree of intensity modulation of the monitoring signal light Sc, in accordance with the light receiving information. The nonlinear optical effect becomes conspicuous because an amount of change in the transmission power of the monitoring signal light Sc increases and an amount of change in an optical phase also increases, as the modulation degree of the intensity modulation becomes larger.

Thus, by lowering the modulation degree to an appropriate value while monitoring the light receiving state of the monitoring signal light Sc by means of the light receiving information, the transmission device 1a may reduce the amount of change in the transmission power of the monitoring signal light Sc while meeting requests of the transmission quality of the monitoring signal light Sc. Therefore, the transmission device 1a may suppress the nonlinear optical effect without degrading the monitoring control function.

Because the transmission device 1a reduces the modulation degree, not the transmission power of the monitoring signal light Sc, the transmission device 1a does not have to include means to reduce the transmission power, such as a variable light attenuator, for example. Therefore, a scale of the transmission device 1a is reduced. In the following, configurations of the transmission devices 1a and 1b are set forth.

The transmission device 1a includes an FPGA 10a, a memory 12a, a small form-factor pluggable (SFP) 20a, and optical amplifiers 30a and 31a. The transmission device 1a further includes an optical splitter 23a, filters 33a and 34a, and a photodiode (PD) 25a. Similarly to the transmission device 1a, the transmission device 1b includes an FPGA 10b, a memory 12b, an SFP 20b, optical amplifiers 30b and 31b, an optical splitter 23b, filters 33b and 34b, and a PD 25b. Note that the transmission devices 1a and 1b may include another circuit such as an application-specific integrated circuit (ASIC), in place of the FPGAs 10a and 10b.

The optical amplifiers 30a and 30b amplify the main signal light Sm and Sm', respectively, that are inputted from adjacent nodes. The FPGAs 10a and 10b respectively control gains of the optical amplifiers 30a and 30b. The main signal light Sm is inputted from the optical amplifier 30a to the filter 33a, and the main signal light Sm' is inputted from the optical amplifier 30b to the filter 33b.

The SFPs 20a and 20b are respectively optical modules that are detachable to the transmission devices 1a and 1b. The SFPs 20a and 20b respectively include transmission units (Tx) 200a and 200b that transmit the monitoring signal light Sc and Sc', and reception units (Rx) 201a, 201b that receive the monitoring signal light Sc and Sc'.

The transmission units 200a and 200b generate the monitoring signal light Sc and Sc' with the intensity modulation based on the monitoring signal. The transmission units 200a and 200b include laser diodes, or the like, which output the monitoring signal light Sc and Sc', as described below. The monitoring signal light Sc and Sc' are respectively inputted from the transmission units 200a and 200b to the filters 33a and 33b. Note that the transmission unit 200a is an example of a transmitter.

The filter 33a is an example of a multiplexer and multiplexes the monitoring signal light Sc into the main signal light Sm. The filter 33b multiplexes the monitoring signal light Sc' into the main signal light Sm'. Although an optical filter including a wavelength-multiplex function, for example, is listed as the filters 33a and 33b, the filters 33a and 33b are not limited to this. Multiplexed light of the monitoring signal light Sc and the main signal light Sm is outputted from the filter 33a to the transmission path 90, and multiplexed light of the monitoring signal light Sc' and main signal light Sm' is outputted from the filter 33b to the transmission path 91.

The multiplexed light of the monitoring signal light Sc and the main signal light Sm is inputted from the transmission path 90 to a filter 34b. The filter 34b is an example of a demultiplexer and demultiplexes the main signal light Sm and the monitoring signal light Sc from the multiplexed light inputted from the transmission path 90.

The multiplexed light of the monitoring signal light Sc' and the main signal light Sm' is inputted from the transmission path 91 to a filter 34a. The filter 34a demultiplexes the main signal light Sm' and the monitoring signal light Sc' from the multiplexed light inputted from the transmission path 91. Although an optical filter including a wavelength separation function, for example, is listed as the filters 34a and 34b, the filters 34a and 34b are not limited to this.

The main signal light Sm and Sm' are respectively inputted from the filters 34a and 34b to the optical amplifiers 31a and 31b. The optical amplifiers 31a and 31b amplify the main signal light Sm and Sm', respectively. The FPGAs 10a and 10b respectively control gains of the optical amplifiers 31a and 31b. The main signal light Sm and Sm' are respectively outputted from the optical amplifiers 31a and 31b to adjacent nodes.

The monitoring signal light Sc is inputted from the filter 34b to the optical splitter 23b, and the monitoring signal light Sc' is inputted from the filter 34a to the optical splitter 23a. The optical splitter 23b branches the monitoring signal light Sc and guides the monitoring signal light Sc to the SFP 20b and the PD 25b. The optical splitter 23a branches the monitoring signal light Sc' and guides the monitoring signal light Sc' to the SFP 20a and the PD 25a.

Reception units 201a and 201b of the SFPs 20a and 20b receive the monitoring signal light Sc and Sc', convert the monitoring signal light Sc and Sc' to electrical monitoring signals, and output the electrical monitoring signals to the FPGAs 10a and 10b, respectively. The reception units 201a and 201b include the PDs or the like for converting the monitoring signal light Sc and Sc' to the monitoring signal.

The FPGAs 10a and 10b each acquire monitoring control information related to the monitoring control of the transmission devices 1a and 1b from payload data of the monitoring signal. The FPGA 10a controls the gains of the optical amplifiers 30a and 31a based on the monitoring control information, for example. The FPGA 10b controls the gains of the optical amplifiers 30b and 31b based on the monitoring control information, for example.

The PD 25b is an example of a detector and detects the light receiving state of the monitoring signal light Sc. The PD 25b detects light receiving power of the monitoring signal light Sc by optically-electrically converting the monitoring signal light Sc. Information on the light receiving power of the monitoring signal light Sc (hereinafter denoted as "power information") is inputted, as the light receiving information, from the PD 25b to the FPGA 10b.

The FPGA 10b inserts the power information into the payload data of the monitoring signal and outputs the monitoring signal to the SFP 20b. The PD 25a detects the light receiving power by optically-electrically converting the monitoring signal light Sc' and notifies the FPGA 10a.

The transmission unit 200b of the SFP 20b generates and outputs the monitoring signal light Sc' by electrically-optically converting the monitoring signal. This notifies the power information from the transmission device 1b that receives the monitoring signal light Sc to the transmission device 1a from which the monitoring signal light Sc is transmitted. In this manner, the FPGA 10b of the transmission device 1b on receiving side notifies the light receiving power of the monitoring signal light Sc detected by the PD 25b to the transmission device 1a on transmitting side. Note that the FPGA 10b is an example of a second control circuit.

The SFP 20a of the transmission device 1a on the transmitting side receives the monitoring signal light Sc' from the transmission device 1b on the receiving side. The reception unit 201a of the SFP 20a regenerates the monitoring signal by optically-electrically converting the monitoring signal light Sc' and outputs the monitoring signal light Sc' to the FPGA 10a. The monitoring signal includes the power information of the monitoring signal light Sc in the transmission device 1b on the receiving side.

In this manner, the reception unit 201a acquires the power information from the transmission device 1b on the receiving side. The FPGA 10a extracts the power information from the payload data of the monitoring signal. Note that the reception unit 201a is an example of a receiver.

FPGA 10a is an example of a first control circuit and controls the modulation degree of the intensity modulation of the monitoring signal light Sc, in accordance with the light receiving power indicated by the power information.

Figure 1B:
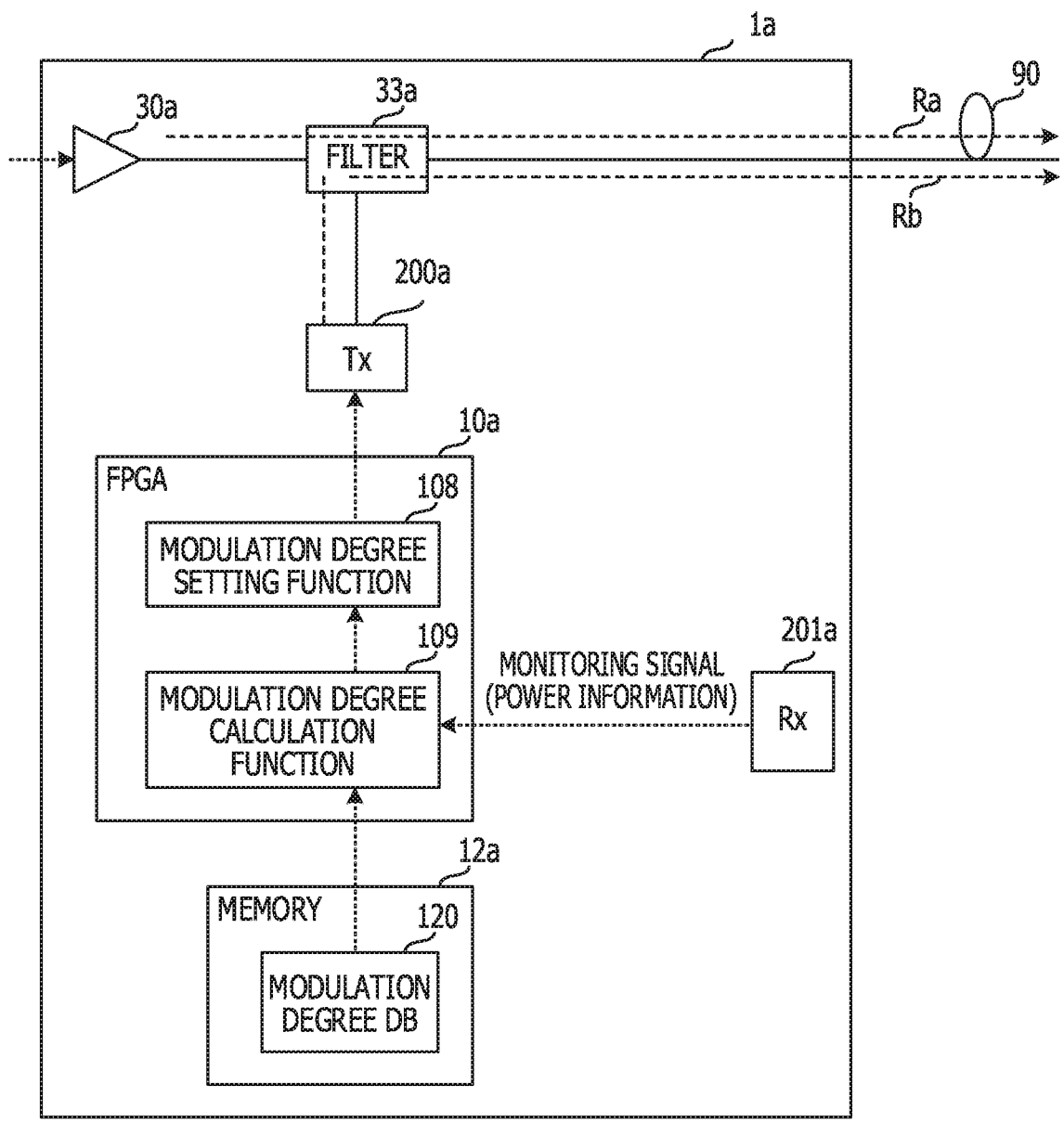
FIG. 1B is a configuration diagram illustrating an example of a function of a field-programmable gate array (FPGA) related to control of a modulation degree.

FIG. 1B is a configuration diagram illustrating an example of a function of the FPGA 10a, the function being related to control of the modulation degree. Note that although the FPGA 10a of the transmission device 1a on the transmitting side is described in this example, the FPGA 10b of the transmission device 1b on the receiving side has the function similar to this.

The FPGA 10a has a modulation degree setting function 108 and a modulation degree calculation function 109. The memory 12a stores a modulation degree database (DB) 120. As described below, a relationship of the light receiving power and the modulation degree is registered in the modulation degree DB 120.

The FPGA 10a acquires the power information of the monitoring signal light Sc by receiving the monitoring signal from the reception unit 201a. Using the modulation degree calculation function 109, the FPGA 10a calculates the modulation degree by referring to the modulation degree DB 120 based on the power information.

Next, the FPGA 10a sets the modulation degree for the transmission unit 200a, using the modulation degree setting function 108. At this time, the FPGA 10a changes a drive current of the laser diode of the transmission unit 200a.

Figure 2:
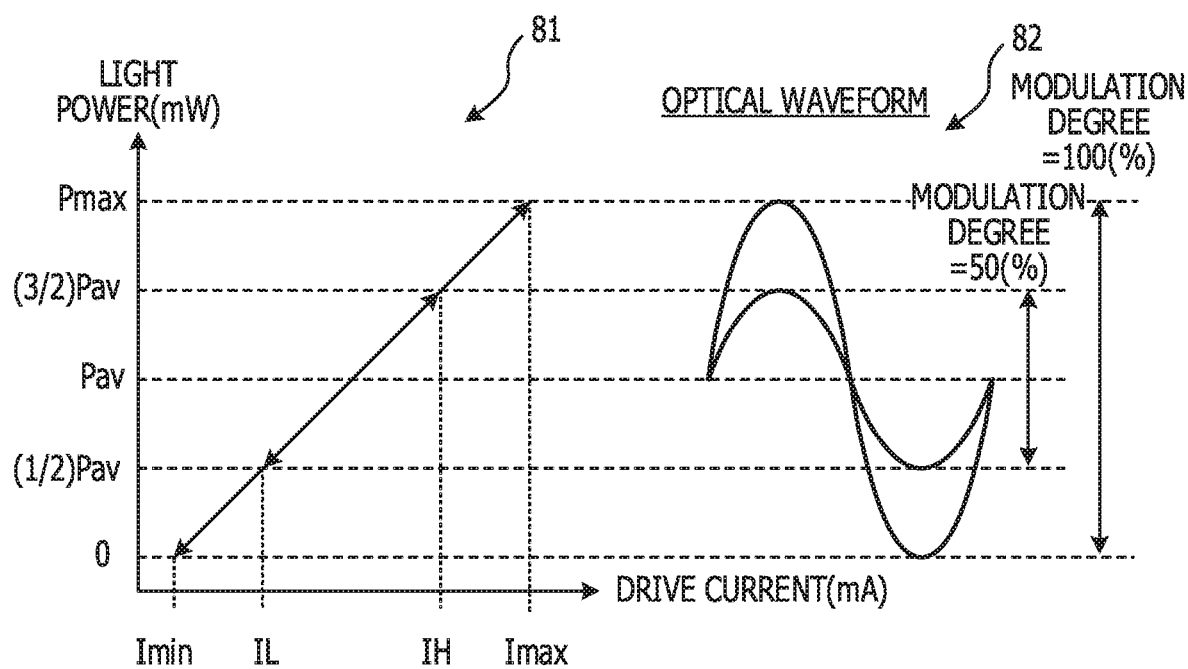
FIG. 2 is a diagram illustrating a modification example of light power to a drive current of a laser diode and an example of an optical waveform.

FIG. 2 is a diagram illustrating a modification example (see a numeral 81) of the light power (mW) with respect to the drive current (mA) of the laser diode, and an example of an optical waveform (see a numeral 82). The larger the drive current is, the larger the light power of the laser diode is.

If the modulation degree is 100(%), the light power changes in a range from 0 (mW) to Pmax (mW) with average light power Pay (mW) as a center, by the drive current of the laser diode, for example, being controlled in the range from 0 (mA) to Imax (mA). Note that the range of the drive current is not limited to the above-mentioned range, and the drive current may also range from, for example, several tens (mA) to Imax (mA) in accordance with a threshold at which light is outputted from the laser diode. If the modulation degree is 50(%), the light power changes in the range from (1/2) Pay (mW) to (3/2) Pay (mW) with the average light power Pay (mW) as the center, by the drive current of the laser diode, for example, being controlled in the range from IL (mA) (>Imin) to IH (mA) (<Imax).

In this manner, the FPGA 10a reduces the amount of change in the light power by narrowing the range of the drive current. This reduces the nonlinear optical effect between the monitoring signal light Sc and the main signal light Sm. Note that a bias current of the laser diode is controlled so that the average light power Pay (mW) is fixed.

Next, description is given of a configuration of the FPGA 10a and the transmission unit 200a.

Figure 3:
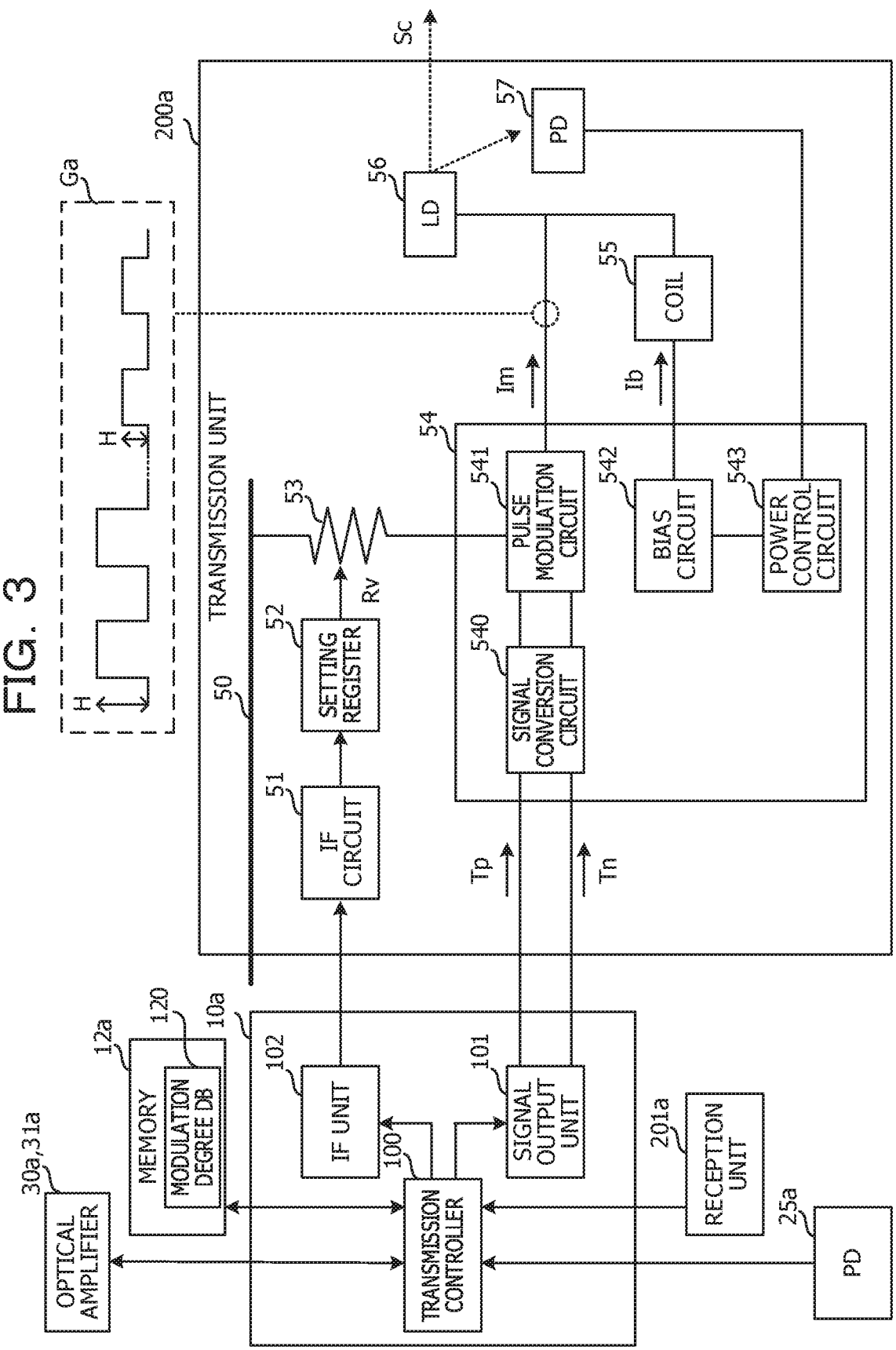
FIG. 3 is a configuration diagram illustrating an example of the FPGA and a transmission unit.

FIG. 3 is a configuration diagram illustrating an example of the FPGA 10a and a transmission unit 200a. Although the FPGA 10a and the transmission unit 200a of the transmission device 1a on the transmitting side of the monitoring signal light Sc are described in this example, the FPGA 10b and the transmission unit 200b of the transmission device 1b on the receiving side of the monitoring signal light Sc have a configuration similar to this.

The FPGA 10a includes a transmission controller 100, a signal output unit 101, and an interface (IF) unit 102. The transmission controller 100 and the signal output unit 101 are formed as a circuit within the FPGA 10a, but may be a function that is formed by a central processing unit (CPU) reading out a program from a memory.

The transmission controller 100 controls transmission of the monitoring signal light Sc to the transmission device 1b. The transmission controller 100 generates the monitoring control information by communicating with the optical amplifiers 30a and 31a and outputs the monitoring control information to the signal output unit 101. The transmission controller 100 generates the power information of the monitoring signal light Sc' of the transmission device 1b from a signal inputted from the PD 25a and outputs the power information to the signal output unit 101.

The signal output unit 101 generate respective data signals Tp and Tn of a normal phase and a reverse phase from the monitoring control information and the power information and outputs the respective data signals Tp and Tn to the transmission unit 200a.

The reception unit 201a inputs to the transmission controller 100 the monitoring signal obtained by conversion of the monitoring signal light Sc'. The transmission controller 100 determines the modulation degree corresponding to the power information included in the monitoring signal. Note that this function of the transmission controller 100 corresponds to the modulation degree calculation function 109.

The transmission controller 100 calculates the modulation degree corresponding to the power information from the modulation degree DB 120 stored in the memory 12a, for example.

Figure 4:
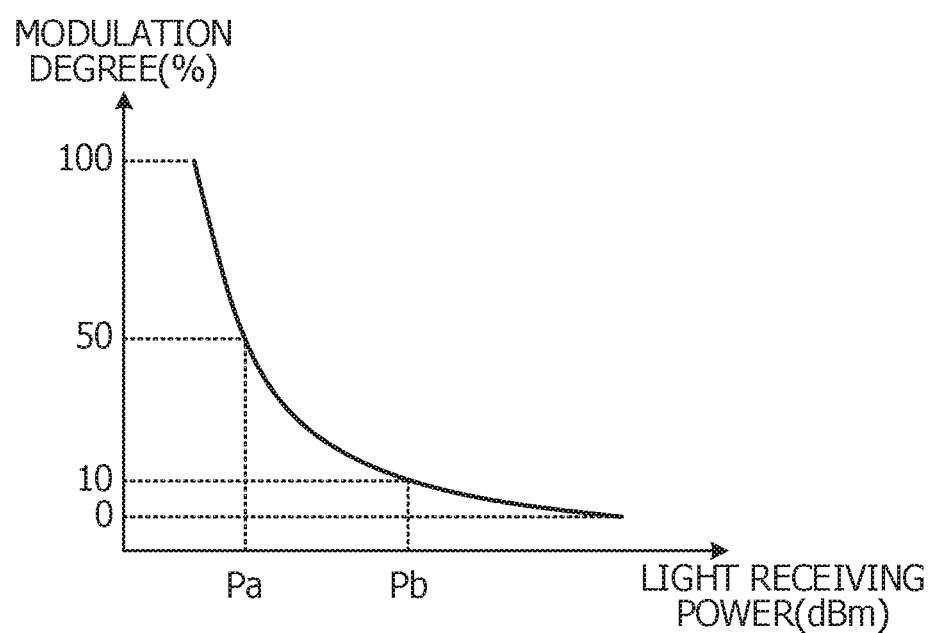
FIG. 4 is a diagram illustrating an example of a relationship of light receiving power and the modulation degree.

FIG. 4 is a diagram illustrating an example of the relationship of the light receiving power and the modulation degree. A horizontal axis represents the light receiving power (dBm) indicated by the power information. A vertical axis represents the modulation degree (%) desirable for normal reception of the monitoring control information. Note that the modulation degree is, for example, the lowest value desirable for the normal reception of the monitoring control information or a value obtained by adding a predetermined margin to the lowest value.

As described above, the memory 12a stores the modulation degree DB 120 that indicates the relationship of the light receiving power and the modulation degree. The transmission controller 100 determines the modulation degree by referring to the modulation degree DB 120 based on the light receiving power indicated by the power information. For example, the transmission controller 100 determines that the modulation degree is 50(%) if the light receiving power is Pa, and determines that the modulation degree is 10(%) if the light receiving power is Pb (>Pa). Therefore, the larger the light receiving power is, the lower the modulation degree is. Note that the memory 12b also stores a database similar to the modulation degree DB 120 in the memory 12a. The FPGA 10b controls the modulation degree by referring to the database.

In this manner, the transmission controller 100 controls the modulation degree in accordance with the light receiving power indicated by the power information. Therefore, the transmission device 1a may control the modulation degree with high precision, in accordance with a transmission loss of the monitoring signal light Sc in the transmission path 90, for example. Note that the transmission controller 100 may determine the modulation degree from a predetermined calculation expression that indicates the relationship illustrated in FIG. 2, for example, without using the database.

With reference to FIG. 3 again, the transmission unit 200a includes a power source line 50, an interface (IF) circuit 51, a setting register 52, an adjusting resistor 53, a driver circuit 54, a coil 55, a laser diode (LD) 56, and a PD 57.

The driver circuit 54 drives the laser diode 56 that outputs the monitoring signal light Sc. The power source line 50 feeds to the driver circuit 54. The adjusting resistor 53 is coupled between the power source line 50 and the driver circuit 54.

The adjusting resistor 53 is an example of a variable resistor and the setting register 52 sets a resistance value Rv. Although a potentiometer, for example, is listed as the adjusting resistor 53, the adjusting resistor 53 is not limited to this. The interface circuit 51 communicates with the interface unit 102 of the FPGA 10a via, for example, an Inter-Integrated Circuit (I2C) or a Serial Peripheral Interface (SPI), or the like.

The transmission controller 100 indicates to the interface unit 102 the resistance value Rv corresponding to the light receiving power indicated by the power information. The interface unit 102 sets the setting register 52 based on the resistance value Rv. Note that the interface unit 102 corresponds to the modulation degree setting function 108.

For example, the setting register 52 sets the resistance value Rv of the adjusting resistor 53 by setting a resistance value coupled to the adjusting resistor 53 in parallel. This enables the FPGA 10a to control the resistance value Rv of the adjusting resistor 53.

The signal output unit 101 inputs to the driver circuit 54 the respective data signals Tp and Tn of the normal phase and the reverse phase. The driver circuit 54 generates a modulation current Im from the respective data signals Tp and Tn of the normal phase and the reverse phase and outputs a modulation current Im to the laser diode 56.

The driver circuit 54 outputs a bias current Ib to the laser diode 56 so that the average light power Pay of the monitoring signal light Sc is maintained at a fixed value. The bias current Ib is inputted to the laser diode 56 via the coil 55. Therefore, a part of the bias current Ib that varies with time is smoothed.

The PD 57 monitors the light power of the monitoring signal light Sc outputted from the laser diode 56. The PD 57 converts the monitoring signal light Sc into an electrical signal and outputs the electrical signal to the driver circuit 54. The driver circuit 54 feedback-controls the bias current Ib based on the electrical signal from the PD 57.

The driver circuit 54 includes a signal conversion circuit 540, a pulse modulation circuit 541, a bias circuit 542, and a power control circuit 543. The power control circuit 543 is coupled to the PD 57. The power control circuit 543 detects the average light power Pay of the monitoring signal light Sc based on the electrical signal from the PD 57 and notifies a detected value to the bias circuit 542.

The bias circuit 542 controls the bias current Ib so that the average light power Pay is fixed.

The signal conversion circuit 540 converts a voltage level of the respective data signals Tp and Tn of the normal phase and the reverse phase, for example, and outputs the respective data signals Tp and Tn to the pulse modulation circuit 541. The pulse modulation circuit 541 is an example of a modulation circuit, and generates the modulation current Im from the respective data signals Tp and Tn of the normal phase and the reverse phase and outputs the modulation current Im to the laser diode 56. The modulation current Im joins the bias current Ib, is inputted to the laser diode 56, and is used for the intensity modulation of the monitoring signal light Sc.

The pulse modulation circuit 541 determines a logical level ("0" or "1") of the monitoring signal from the voltage level of the respective data signals Tp and Tn of the normal phase and the reverse phase, and generates the pulsed modulation current Im (see a numeral Ga) in accordance of a result of determination. As the modulation current Im changes in accordance with the resistance value Rv of the adjusting resistor 53 coupled to the pulse modulation circuit 541, a pulse size H changes.

Figure 5:
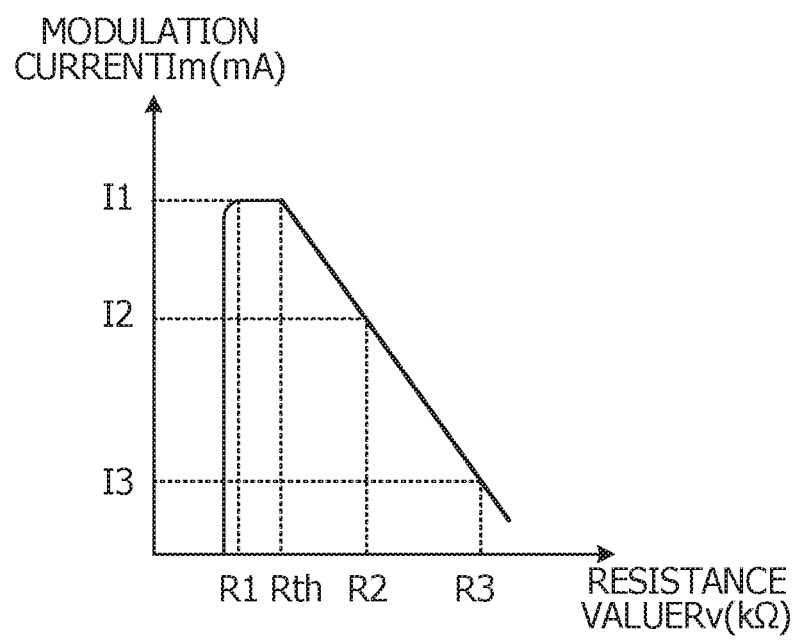
FIG. 5 is a diagram illustrating an example of a change in a modulation current with respect to a resistance value of an adjusting resistor.

FIG. 5 is a diagram illustrating an example of the change in the modulation current Im with respect to the resistance value Rv of the adjusting resistor 53. The horizontal axis represents the resistance value Rv (kΩ), and the vertical axis represents the modulation current Im (mA). Note that scales of the horizontal axis and the vertical axis are defined by logarithms.

In the range where the resistance value Rv is equal to or larger than Rth (kΩ), the larger the resistance value Rv is, the smaller the modulation current Im is. The transmission controller 100 controls the modulation current Im by adjusting the resistance value Rv so that the modulation degree is a value corresponding to the light receiving power.

For example, if the transmission controller 100 controls the modulation degree to 90(%), the transmission controller 100 controls the modulation current Im to I1 (mA) by setting the resistance value Rv to R1 (kΩ) (<Rth). If the transmission controller 100 controls the modulation degree to 20(%), the transmission controller 100 controls the modulation current Im to I2 (mA) (<I1) by setting the resistance value Rv to R2 (kΩ) (>Rth). If the transmission controller 100 controls the modulation degree to 2(%), the transmission controller 100 controls the modulation current Im to I3 (mA) (<I2) by setting the resistance value Rv to R3 (kΩ) (>R2).

In this manner, the transmission controller 100 controls the modulation degree of the intensity modulation by adjusting the resistance value Rv of the adjusting resistor 53 in accordance with the power information. Therefore, the transmission controller 100 may control the modulation degree for the general driver circuit 54.

The transmission controller 100 may adjust a supply voltage of the power source line 50, in place of the resistance value Rv.

Figure 6:
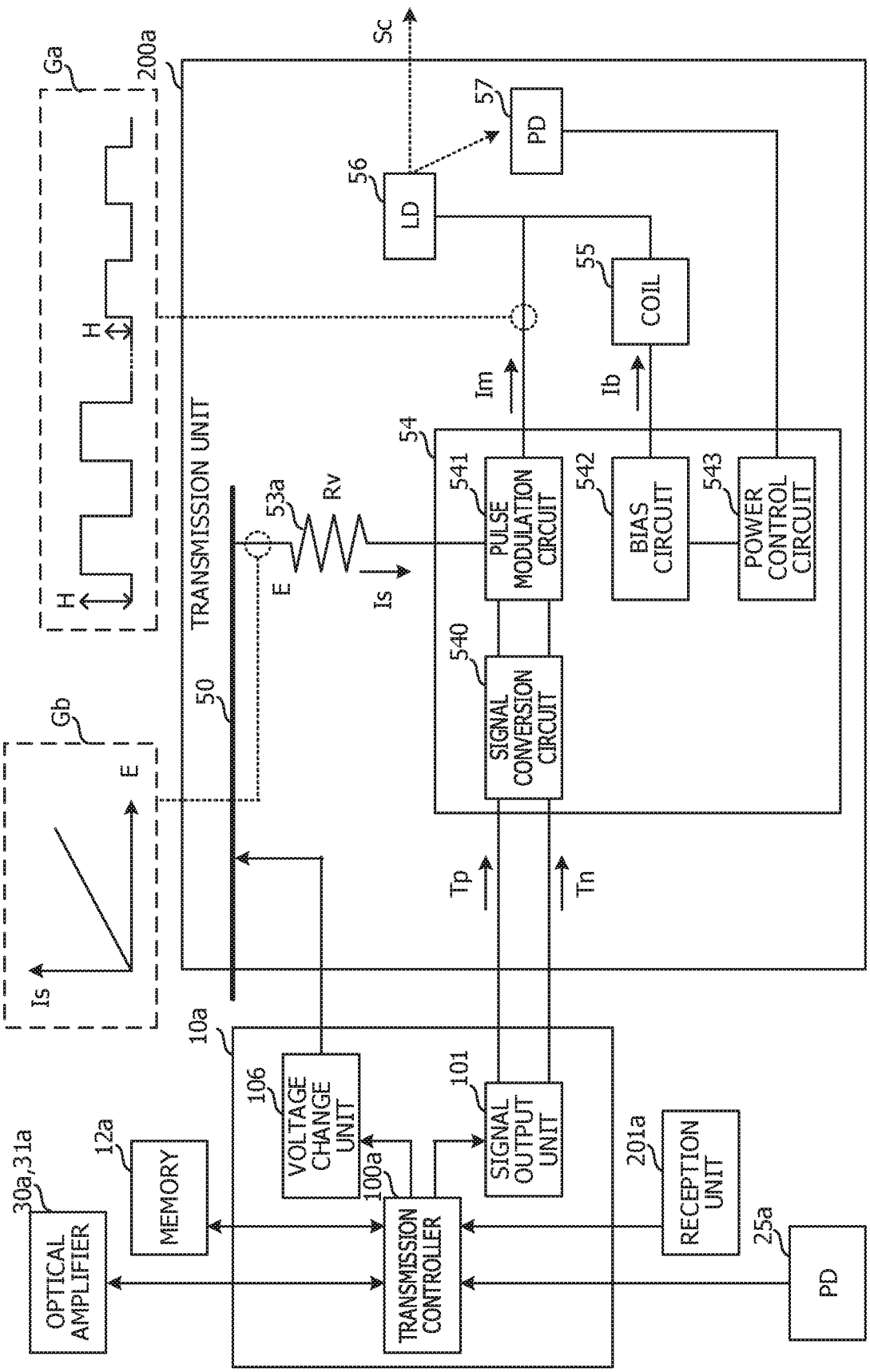
FIG. 6 is a configuration diagram illustrating another example of the FPGA and the transmission unit.

FIG. 6 is a configuration diagram illustrating another example of the FPGA 10a and the transmission unit 200a. In FIG. 6, constituents common to those in FIG. 3 are denoted by the same reference numerals, and description thereof is omitted.

The FPGA 10a includes a transmission controller 100a, the signal output unit 101, and a voltage change unit 106. The voltage change unit 106 is, for example, a digital-analog converter and coupled to the power source line 50 of the pulse modulation circuit 541.

The transmission unit 200a includes the interface circuit 51, the setting register 52, and an adjusting resistor 53a in place of the adjusting resistor 53. The adjusting resistor 53a is an example of a resistor and has a predetermined resistance value.

The pulse modulation circuit 541 is coupled to the power source line 50 via the adjusting resistor 53a. The power source line 50 feeds to the pulse modulation circuit 541.

The voltage change unit 106 changes a voltage E to be applied to the adjusting resistor 53a, in accordance with a voltage indicated by the transmission controller 100a. The transmission controller 100a indicates to the voltage change unit 106 a voltage corresponding to the modulation degree.

Since the resistance value of the adjusting resistor 53a is a fixed value, a supply current Is that flows from the adjusting resistor 53a to the pulse modulation circuit 541 is proportional to the voltage E, as depicted by a numeral Gb. Therefore, the pulse modulation circuit 541 outputs to the laser diode 56 the modulation current Im corresponding to the voltage E.

In this manner, the transmission controller 100a controls the modulation degree of the intensity modulation by adjusting the voltage E to be applied to the adjusting resistor 53a in accordance with the power information. Therefore, the transmission controller 100a may control the modulation degree for the general driver circuit 54.

In the following, description is given of a transmission method by the transmission devices 1a and 1b.

Figure 7:
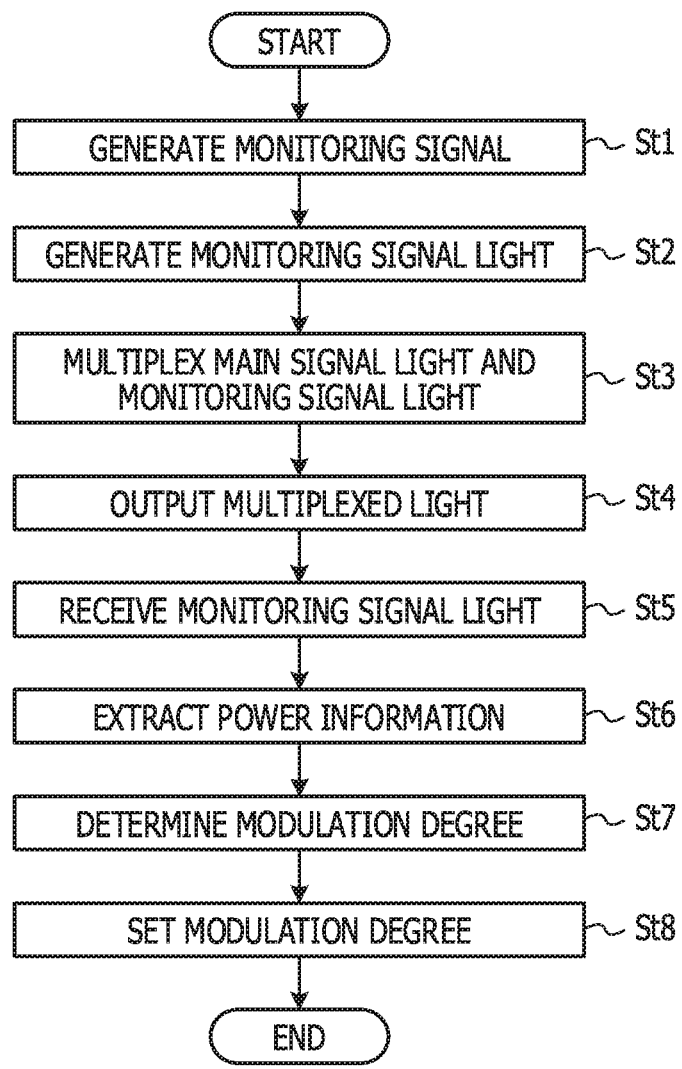
FIG. 7 is a flowchart illustrating an example of a setting process of the modulation degree.

FIG. 7 is a flowchart illustrating an example of a setting process of the modulation degree. This process is executed if the monitoring signal light Sc is transmitted. Note that operation of the transmission device 1a is described in the following example, the other transmission device 1b operates similarly to the transmission device 1a.

The FPGA 10a generates a monitoring signal including the monitoring control information by communicating with the optical amplifiers 30a and 30b (step SU). The monitoring signal is inputted to the transmission unit 200a of the SFP 20a.

Next, the transmission unit 200a generate the monitoring signal light Sc with the intensity modulation based on the monitoring signal (step St2). The monitoring signal light Sc is inputted to the filter 33a.

Next, the filter 33a multiplexes the main signal light Sm inputted from the optical amplifier 30a with the monitoring signal light Sc (step St3). Then, multiplexed light of the main signal light Sm and the monitoring signal light Sc is outputted from the filter 33a to the transmission path 90 (step St4).

Next, the reception unit 201a receives the monitoring signal light Sc' from the other transmission device 1b (step St5). The reception unit 201a converts the monitoring signal light Sc' into an electrical monitoring signal and outputs the electrical monitoring signal to the FPGA 10a.

Next, the FPGA 10a extracts the power information from the monitoring signal (step St6). Then, based on the power information, the FPGA 10a determines the modulation degree by referring to the modulation degree DB 120 in the memory 12a as illustrated in FIG. 4 (step St7).

Next, the FPGA 10a sets the modulation degree for the transmission unit 200a (step St8). At this time, as described above, the FPGA 10a sets the modulation degree by setting, for example, the resistance value Rv or the voltage E corresponding to the modulation degree. The setting process of the modulation degree is thus executed.

Figure 8:
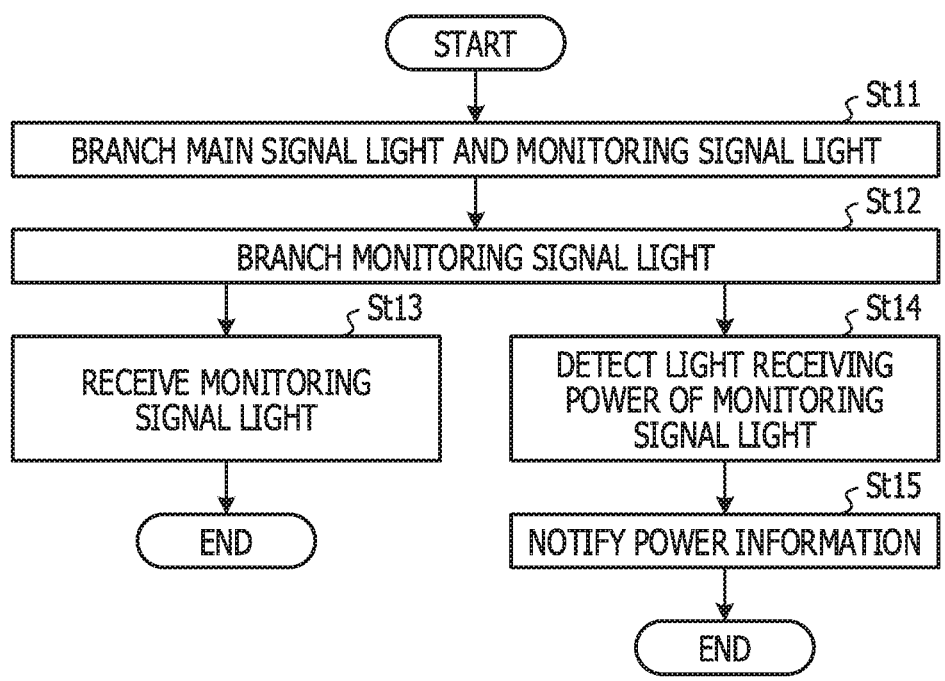
FIG. 8 is a flowchart illustrating an example of a reception process of monitoring signal light.

FIG. 8 is a flowchart illustrating an example of a reception process of the monitoring signal light Sc. This process is executed if the monitoring signal light Sc is received. Note that although the operation of the transmission device 1b is described in the following example, the other transmission device 1a operates similarly to the transmission device 1b.

The filter 34b demultiplexes the main signal light Sm and the monitoring signal light Sc from the multiplexed light inputted from the transmission path 90 (step St11). The main signal light Sm is inputted to the optical amplifier 31b, and the monitoring signal light Sc is inputted to the optical splitter 23b. The optical splitter 23b demultiplexes the monitoring signal light Sc (step St12). The monitoring signal light Sc is inputted to the reception unit 201b and the PD 25b. The following step St13 and steps St14 and St15 are simultaneously executed in parallel.

The reception unit 201b receives the one monitoring signal light Sc (step St13). The PD 25b detects the light receiving power of the monitoring signal light Sc (step St14). The PD 25b outputs to FPGA 10b the electrical signal obtained by optical-electrical conversion of the monitoring signal light Sc.

The FPGA 10b generates the power information indicating the light receiving power based on the electrical signal inputted from the PD 25b, and the transmission unit 200b notifies the power information to the transmission device 1a (step St15). The reception process of the monitoring signal light Sc is thus executed.

In this example, although the power information is used as the light receiving information that indicates the light receiving state of the monitoring signal light Sc, the light receiving information is not limited to this. For example, a reception completion notice of the monitoring control information included in the monitoring signal light Sc may be used as the light receiving information.

In this case, the FPGA 10a lowers the modulation degree below a predetermined target value, in accordance with the reception completion notice of the monitoring signal light Sc. This allows for reduction of the amount of change in the transmission power of the monitoring signal light Sc, while meeting the request of the transmission quality of the monitoring signal Sc. Therefore, the transmission device 1a may suppress the nonlinear optical effect without degrading the monitoring control function. In the following, the operations of the transmission devices 1a and 1b are set forth.

Figure 9:
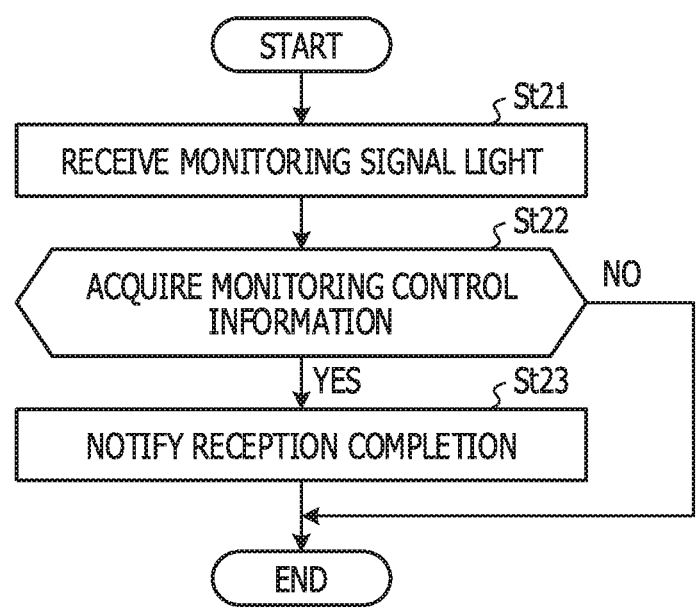
FIG. 9 is a flowchart illustrating an example of a notification process of reception completion of monitoring control information.

FIG. 9 is a flowchart illustrating an example of a notification process of the reception completion of the monitoring control information. This process is executed every time the monitoring signal light Sc is received. Note that although the operation of the transmission device 1b is described in the following example, the other transmission device 1a operates similarly to the transmission device 1b.

The reception unit 201b receives the monitoring signal light Sc from the transmission device 1a (step St21). The monitoring signal light Sc is inputted to the FPGA 10b as a monitoring signal by the optical-electrical conversion.

Next, the FPGA 10b determines whether or not the monitoring control information is acquired from the monitoring signal (step St22). For example, if the light receiving power of the monitoring signal light Sc is in the range capable of normal reception, the monitoring control information is acquired. However, if the light receiving power is out of the range capable of the normal reception, the monitoring control information is not acquired.

If the FPGA 10b acquires the monitoring control information (Yes of step St22), the FPGA 10b notifies the reception completion of the monitoring control information to the transmission device 1a via the transmission unit 200b (step St23). If the FPGA 10b does not acquire the monitoring control information (No of step St22), the FPGA 10b terminates the process without notifying the reception completion of the monitoring control information. The notification process of the reception completion of the monitoring control information is thus executed.

While transmitting the monitoring signal light Sc, the transmission device 1a determines whether or not the transmission device 1a receives the reception completion notice from the other transmission device 1b, and controls the modulation degree in accordance with the result of the determination.

Figure 10:
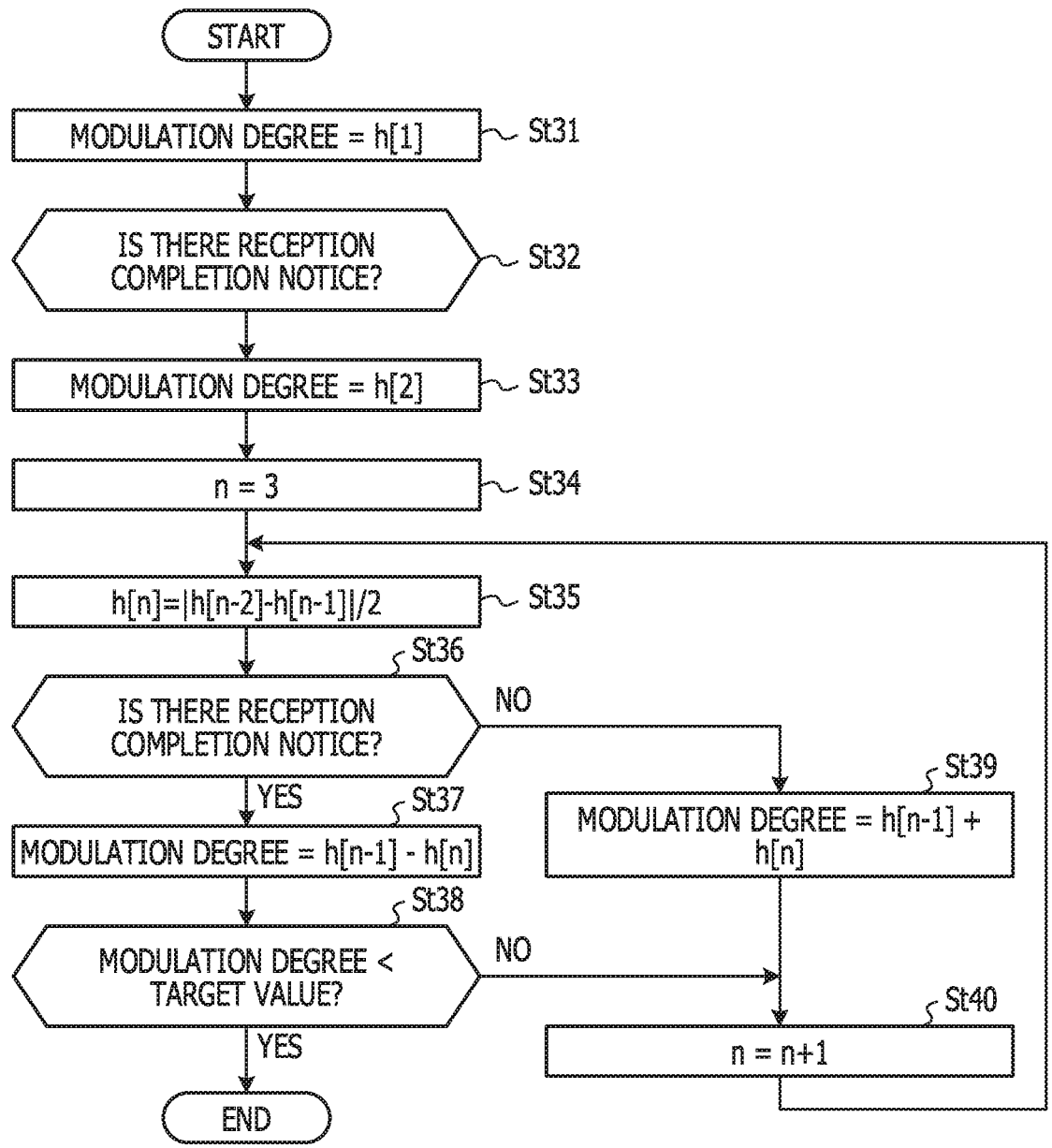
FIG. 10 is a flowchart illustrating another example of the setting process of the modulation degree.

FIG. 10 is a flowchart illustrating another example of the setting process of the modulation degree. This process is executed together with the transmission of the monitoring signal light Sc. Note that means of setting the modulation degree is as described with reference to FIGS. 3 and 6.

The FPGA 10a sets the modulation degree to a predetermined value h[1] (step St31). The predetermined value h[1] is an initial value of the modulation degree and is 100(%), for example.

Next, the FPGA 10a determines whether or not there is the reception completion notice of the monitoring signal light Sc from the other transmission device 1b (step St32). At this time, using a timer or the like, the FPGA 10a monitors time elapsed since the execution of the step St31 is complete, for example, and determines whether or not the FPGA 10a receives the reception completion notice before the timer expires. If the FPGA 10a does not receive the reception completion notice (No of step St32), the FPGA 10a terminates the process.

If the FPGA 10a receives the reception completion notice (Yes step St32), the FPGA 10a sets the modulation degree to a predetermined value h[2] (step St33). The predetermined value h[2] is 50(%), for example. Then, the FPGA 10a sets a variable n (positive integer) to 3 (step St34).

$$h[n]=|h[n-2]-h[n-1]|/2 \quad (1)$$

Next, the FPGA 10a calculates a variable h[n] according to the above-described expression (1) (step St35). If the step St35 is first executed, the FPGA 10a calculates h[3]=25(%) (=(100−50)/2) where the predetermined value [1]=100(%) and the predetermined value h[2]=50(%).

Next, the FPGA 10a determines whether or not there is the reception completion notice of the monitoring signal light Sc from the other transmission device 1b (step St36). At this time, using the timer or the like, the FPGA 10a monitors time elapsed since the execution of the step St33 is complete, for example, and determines whether or not the FPGA 10a receives the reception completion notice before the timer expires.

$$\text{Modulation degree}=h[n-1]+h[n] \quad (2)$$

$$\text{Modulation degree}=h[n-1]-h[n] \quad (3)$$

If the FPGA 10a does not receive the reception completion notice (No of step St36), the FPGA 10a determines that the monitoring signal light Sc is not normally received due to the low modulation degree. The FPGA 10a calculates the modulation degree from the expression (2) and sets the modulation degree (step St39). In this case, the modulation degree increases.

Next, the FPGA 10a adds 1 to the variable n (step St40) and executes respective processes after the step St35. Note that in this case, in the step St36, using the timer or the like, the FPGA 10a monitors time elapsed since execution of a process in step St39 is complete, for example, and determines whether or not the FPGA 10a receives the reception completion notice before the timer expires.

If the FPGA 10a receives the reception completion notice (Yes of step St36), the FPGA 10a determines that the monitoring signal light Sc is normally received due to the sufficiently high modulation degree. The FPGA 10a calculates the modulation degree from the expression (3) and sets the modulation degree (step St37). In this case, the modulation degree decreases.

Next, the FPGA 10a compares the modulation degree with the predetermined target value (step St38). The target value is set in advance for the FPGA 10a, for example.

If the modulation degree is higher than the target value (No of step St38), the FPGA 10a adds 1 to the variable n (step St40) and executes the respective processes after the step St35). Note that in this case, in the step St36, using the timer or the like, the FPGA 10a monitors time elapsed since execution of a process in step St37 is complete, for example, and determines whether or not the FPGA 10a receives the reception completion notice before the timer expires.

If the modulation degree is equal to or smaller than the target value (Yes of step St38), the FPGA 10a determines that the modulation degree sufficiently falls and terminates the process. The setting process of the modulation degree is thus executed.

In this manner, the FPGA 10a controls the modulation degree to a value in the range in which the monitoring control information of the monitoring signal light Sc is acquired. Therefore, the FPGA 10a may reduce the modulation degree in accordance with whether or not the other transmission device 1b successfully receives the monitoring control information, without using the modulation degree DB 120 as illustrated in FIG. 4, for example. Therefore, setting time of the modulation degree is shortened.

The foregoing embodiment is a preferred embodiment of the present disclosure. The embodiment, however, is not limited to the foregoing and may be variously changed and modified without departing from the gist of the disclosure.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A transmission device that transmits main signal light to another transmission device via a transmission path, the transmission device comprising:
    a transmitter that generates monitoring signal light with intensity modulation based on a signal related to monitoring control of the transmission device and the other transmission device;
    a multiplexer that multiplexes the monitoring signal light into the main signal light;
    a receiver that acquires light receiving information from the other transmission device, the light receiving information being related to a light receiving state of the monitoring signal light; and
    a control circuit that controls a modulation degree of the intensity modulation to a value in a range in which a monitoring control information included in the monitoring signal light is received, in accordance with the light receiving information.

2. The transmission device according to claim 1, wherein
    the light receiving information indicates light receiving power of the monitoring signal light in the other transmission device, and
    the control circuit controls the modulation degree of the intensity modulation in accordance with the light receiving power.

3. The transmission device according to claim 1, wherein
    the light receiving information indicates completion of reception of the signal related to the monitoring control in the other transmission device, and
    the control circuit controls the modulation degree of the intensity modulation to a value in a range in which the light receiving information is acquired.

4. The transmission device according to claim 1, wherein
    the transmitter includes a laser diode that outputs the monitoring signal light, a modulation circuit that outputs a modulation current to the laser diode, the modulation current being used in the intensity modulation, and a variable resistor coupled to a power source line of the modulation circuit, and
    the control circuit controls the modulation degree of the intensity modulation by adjusting a resistance value of the variable resistor in accordance with the light receiving information.

5. The transmission device according to claim 1, wherein
    the transmitter includes a laser diode that outputs the monitoring signal light, a modulation circuit that outputs a modulation current to the laser diode, the modulation current being used in the intensity modulation, and a resistor coupled to a power source line of the modulation circuit, and
    the control circuit controls the modulation degree of the intensity modulation by adjusting a voltage to be applied to the resistor in accordance with the light receiving information.

6. A transmission system comprising:
    a first transmission device that transmits main signal light to another transmission device via a transmission path; and
    a second transmission device that receives the main signal light from the first transmission device via the transmission path, wherein
    the first transmission device includes
    a transmitter that generates monitoring signal light with intensity modulation based on a signal related to monitoring control of the first transmission device and the second transmission device;
    a multiplexer that multiplexes the monitoring signal light into the main signal light;
    a receiver that acquires light receiving information from the second transmission device, the light receiving information being related to a light receiving state of the monitoring signal light; and
    a first control circuit that controls a modulation degree of the intensity modulation to a value in a range in which a monitoring control information included in the monitoring signal light is received, in accordance with the light receiving information,
    the second transmission device includes
    a demultiplexer that demultiplexes the main signal light and the monitoring signal light inputted from the transmission path;
    a detector that detects the light receiving state of the monitoring signal light; and
    a second control circuit that generates the light receiving information from the light receiving state detected by the detector and notifies the generated light receiving information to the first transmission device.

7. The transmission system according to claim 6, wherein
    the light receiving information indicates light receiving power of the monitoring signal light in the second transmission device, and
    the first control circuit controls the modulation degree of the intensity modulation in accordance with the light receiving power.

8. The transmission system according to claim 6, wherein
    the light receiving information indicates completion of reception of the signal related to the monitoring control in the second transmission device, and
    the first control circuit controls the modulation degree of the intensity modulation to a value in a range in which the light receiving information is acquired.

9. The transmission system according to claim 6, wherein
    the transmitter includes a laser diode that outputs the monitoring signal light, a modulation circuit that outputs a modulation current to the laser diode, the modulation current being used in the intensity modulation, and a variable resistor coupled to a power source line of the modulation circuit, and
    the first control circuit controls the modulation degree of the intensity modulation by adjusting a resistance value of the variable resistor in accordance with the light receiving information.

10. The transmission system according to claim 6, wherein
    the transmitter includes a laser diode that outputs the monitoring signal light, a modulation circuit that outputs a modulation current to the laser diode, the modulation current being used in the intensity modulation, and a resistor coupled to a power source line of the modulation circuit, and the first control circuit controls the modulation degree of the intensity modulation by adjusting a voltage to be applied to the resistor in accordance with the light receiving information.

11. A transmission method of transmitting main signal light from a transmission device to another transmission device via a transmission path, the method comprising:

generating monitoring signal light with intensity modulation based on a signal related to monitoring control of the transmission device and the other transmission device;

multiplexing the monitoring signal light into the main signal light;

acquiring light receiving information from the other transmission device, the light receiving information being related to a light receiving state of the monitoring signal light; and controlling a modulation degree of the intensity modulation to a value in a range in which a monitoring control information included in the monitoring signal light is received, in accordance with the light receiving information.

12. The transmission method according to claim 11, wherein the light receiving information indicates light receiving power of the monitoring signal light in the other transmission device, and the modulation degree of the intensity modulation is controlled in accordance with the light receiving power.

13. The transmission method according to claim 11, wherein the light receiving information indicates completion of reception of the signal related to the monitoring control in the other transmission device, and the modulation degree of the intensity modulation is controlled to a value in a range in which the light receiving information is acquired.

14. The transmission method according to claim 11, wherein the transmission device includes a laser diode that outputs the monitoring signal light, a modulation circuit that outputs a modulation current to the laser diode, the modulation current being used in the intensity modulation, and a variable resistor coupled to a power source line of the modulation circuit, and the modulation degree of the intensity modulation is controlled by adjusting a resistance value of the variable resistor in accordance with the light receiving information.

15. The transmission method according to claim 11, wherein the transmission device includes a laser diode that outputs the monitoring signal light, a modulation circuit that outputs a modulation current to the laser diode, the modulation current being used in the intensity modulation, and a resistor coupled to a power source line of the modulation circuit, and the modulation degree of the intensity modulation is controlled by adjusting a voltage to be applied to the resistor in accordance with the light receiving information.

* * * * *